US010656295B2

(12) United States Patent
Rodriguez-Herrera et al.

(10) Patent No.: US 10,656,295 B2
(45) Date of Patent: May 19, 2020

(54) SYSTEMS AND METHODS FOR DOWNSCALING STRESS FOR SEISMIC-DRIVEN STOCHASTIC GEOMECHANICAL MODELS

(71) Applicant: SCHLUMBERGER TECHNOLOGY CORPORATION, Sugar Land, TX (US)

(72) Inventors: Adrian Rodriguez-Herrera, Bracknell (GB); Xavier Garcia-Teijeiro, Bracknell (GB); Jorg V. Herwanger, Gatwick (GB); Nikolaos Constantinos Koutsabeloulis, Ascot (GB); Tone Trudeng, Abu Dhabi (AE); Jalal Khazanehdari, Abu Dhabi (AE)

(73) Assignee: Schlumberger Technology Corporation, Sugar Land, TX (US)

( * ) Notice: Subject to any disclaimer, the term of this patent is extended or adjusted under 35 U.S.C. 154(b) by 1121 days.

(21) Appl. No.: 14/516,729

(22) Filed: Oct. 17, 2014

(65) Prior Publication Data

US 2015/0112656 A1 Apr. 23, 2015

Related U.S. Application Data

(60) Provisional application No. 61/892,543, filed on Oct. 18, 2013.

(51) Int. Cl.
*E21B 10/26* (2006.01)
*G01V 1/30* (2006.01)

(52) U.S. Cl.
CPC ...... *G01V 1/306* (2013.01); *G01V 2210/6242* (2013.01); *G01V 2210/6244* (2013.01); *G01V 2210/66* (2013.01); *G01V 2210/665* (2013.01)

(58) Field of Classification Search
None
See application file for complete search history.

(56) References Cited

U.S. PATENT DOCUMENTS 6,058,073 A * 5/2000 VerWest .............. G01V 1/28
367/31
2006/0136162 A1* 6/2006 Hamman ............. G01V 1/306
702/104

(Continued)

OTHER PUBLICATIONS

Adachi, et al., "Drilling Adjacent to Salt Bodies: Definition of Mud Weight Window and Pore Pressure Using Numerical Models and Fast Well Planning Tool", SPE Annual Technical Conference and Exhibition, San Antonio, Texas, USA, 2012, pp. 11.

(Continued)

*Primary Examiner* — Timothy A Mudrick (57) ABSTRACT

A method for generating one or more subsurface stress models. The method may include receiving seismic data. A plurality of first geomechanical property models may be generated based at least partially on the seismic data. A second geomechanical property model may be generated based at least partially on the seismic data. The second geomechanical property model may have a lower resolution than the first geomechanical property models. A stress model, a strain model, or a combination thereof may be generated based on the second geomechanical property model. One or more subsurface stress models may be generated based on the stress model, the strain model, or the combination thereof and the first geomechanical property models.

25 Claims, 6 Drawing Sheets

(56) References Cited

U.S. PATENT DOCUMENTS

| | | | | |
|---|---|---|---|---|
| 2009/0187391 A1* | 7/2009 | Wendt | ............... | G01V 1/28 703/7 |
| 2011/0246159 A1 | 10/2011 | Herwanger et al. | | |
| 2011/0295510 A1* | 12/2011 | Gulati | ............... | G01V 1/28 702/16 |
| 2012/0239363 A1* | 9/2012 | Durrani | ............ | E21B 43/00 703/10 |
| 2014/0379312 A1* | 12/2014 | DeDontney | ........ | G01V 11/00 703/2 |

OTHER PUBLICATIONS

Rodriguez-Herrera, et al., "Field-scale Geomechanical Characterization of the Haynesville Shale", ARMA-2013-678, American Rock Mechanics Association, 47th U.S. Rock Mechanics/Geomechanics Symposium, San Francisco, California, Jun. 23-26, 2013, pp. 11.

Herwanger, et al., "Seismic Geomechanics: How to Build and Calibrate Geomechanical Models using 3D and 4D Seismic Data (EET 5)", Houten, The Netherlands: EAGE publications, ISBN Number: 978-90-73834-10-1, 2011, pp. 115-134.

\* cited by examiner

SYSTEMS AND METHODS FOR DOWNSCALING STRESS FOR SEISMIC-DRIVEN STOCHASTIC GEOMECHANICAL MODELS

CROSS-REFERENCE TO RELATED APPLICATIONS

This application claims priority to U.S. Provisional Patent Application having Ser. No. 61/892,543, which was filed on Oct. 18, 2013. This provisional application is incorporated by reference herein in its entirety.

BACKGROUND

Seismic inversion data may be used as an input in geomechanical simulations to construct 3D geomechanical property models. The geomechanical simulations may employ stochastic seismic inversion to construct the 3D geomechanical property models. The stochastic seismic inversion may generate a plurality of geomechanical property models that are equally probable. Thus, each model may be further analyzed to predict a final result (e.g., a subsurface stress field model).

It may take several weeks to produce a subsurface stress field model using a particular geomechanical property model. Accordingly, it may take several months or longer to produce subsurface stress field models for each of the equally probably geomechanical property models.

SUMMARY

A method for generating one or more subsurface stress models is disclosed. The method may include receiving seismic data. First geomechanical property models may be generated based at least partially on the seismic data. A second geomechanical property model may be generated based at least partially on the seismic data. The second geomechanical property model may have a lower resolution than the first geomechanical property models. A stress model, a strain model, or a combination thereof may be generated based on the second geomechanical property model. A subsurface stress model may be generated based on the stress model, the strain model, or the combination thereof and the first geomechanical property models.

A non-transitory computer-readable medium is also disclosed. The medium may store instructions that, when executed by at least one processor of a computing system, cause the computing system to perform operations. The operations may include receiving seismic data. First geomechanical property models may be generated based at least partially on the seismic data. A second geomechanical property model may be generated based at least partially on the seismic data. The second geomechanical property model may have a lower resolution than the first geomechanical property models. A stress model, a strain model, or a combination thereof may be generated based on the second geomechanical property model. A subsurface stress model may be generated based on the stress model, the strain model, or the combination thereof and the first geomechanical property models.

A computing system is also disclosed. The computing system may include a processor and a memory system including a non-transitory computer-readable medium storing instructions that, when executed by the processor, cause the computing system to perform operations. The operations may include receiving seismic data. First geomechanical property models may be generated based at least partially on the seismic data. A second geomechanical property model may be generated based at least partially on the seismic data. The second geomechanical property model may have a lower resolution than the first geomechanical property models. A stress model, a strain model, or a combination thereof may be generated based on the second geomechanical property model. A subsurface stress model may be generated based on the stress model, the strain model, or the combination thereof and the first geomechanical property models.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

Figure 1:
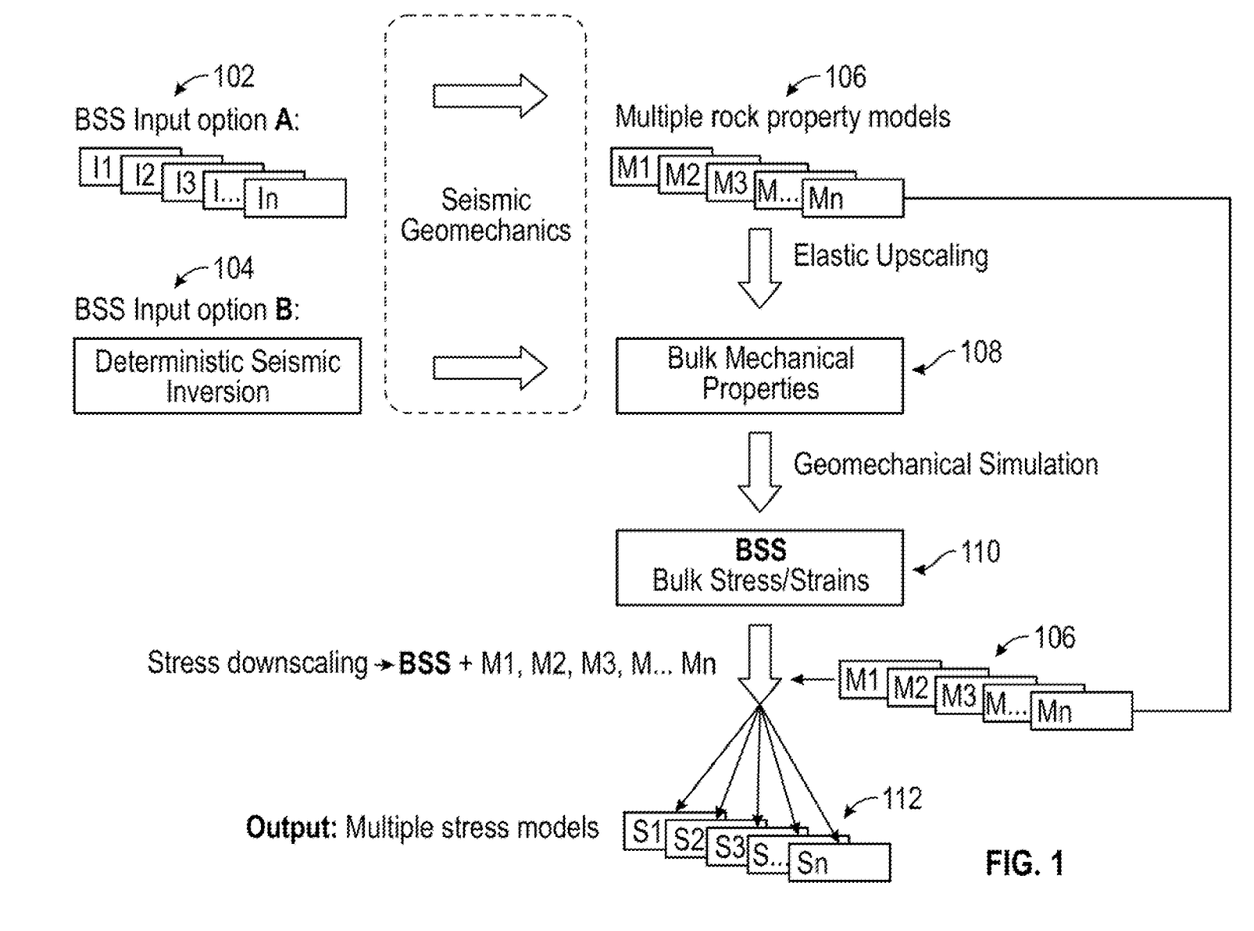
FIG. 1 illustrates a schematic view of a bulk stress and/or strain ("BSS") model being combined with a plurality of fine scale (e.g., high resolution) geomechanical property models to generate a plurality of fine scale subsurface stress models, according to an embodiment.

FIG. 1 illustrates a schematic view of a bulk stress and/or strain ("BSS") model 110 being combined with a plurality of fine scale (e.g., high resolution) geomechanical property models M1, M2, M3 . . . Mn (referred to generally as 106) to generate a plurality of fine scale subsurface stress models S1, S2, S3 . . . Sn (referred to generally as 112), according to an embodiment. The subsurface stress models 112 may be efficiently generated from a series of stochastic seismic inversion ("SSI") property models I1, I2, I3 . . . In (referred to generally as 102). A coarse scale (e.g., low resolution) geomechanical property model 108 (also referred to as an "effective" elastic inversion model) may be created from a set of equally probable inversion runs. A geomechanical simulator may then be used to generate the BSS model 110 that represents the bulk and/or coarse elastic response of the subsurface to existing loading and unloading mechanisms (e.g., gravity, pore pressure, tectonic loading, etc.). For each of the stochastic realizations, the BSS model 110 may be used to compute multiple fine scale subsurface stress models 112 through analytical, semi-analytical, and/or numerical techniques that use the large spatial scale difference between fine scale geomechanical property models 106 and their parent coarse scale model (e.g., the BSS model 110).

The BSS model 110 represents the bulk and/or coarse elastic response of the subsurface. The BSS model 110 behaves in such a way that its total response may be decoupled into a high resolution behavior and a low resolution behavior. The high resolution behavior may be at such a scale that it may be extracted from the BSS model 110, and its contribution may be initially represented by the BSS model 110 in the form of an equivalent medium.

Prior to creating the BSS model 110, the static geomechanical description may be defined, including the geometry and the property distribution. The geometry may be delimited by the boundaries of the region with seismic data and structural interpretations.

Figure 2:
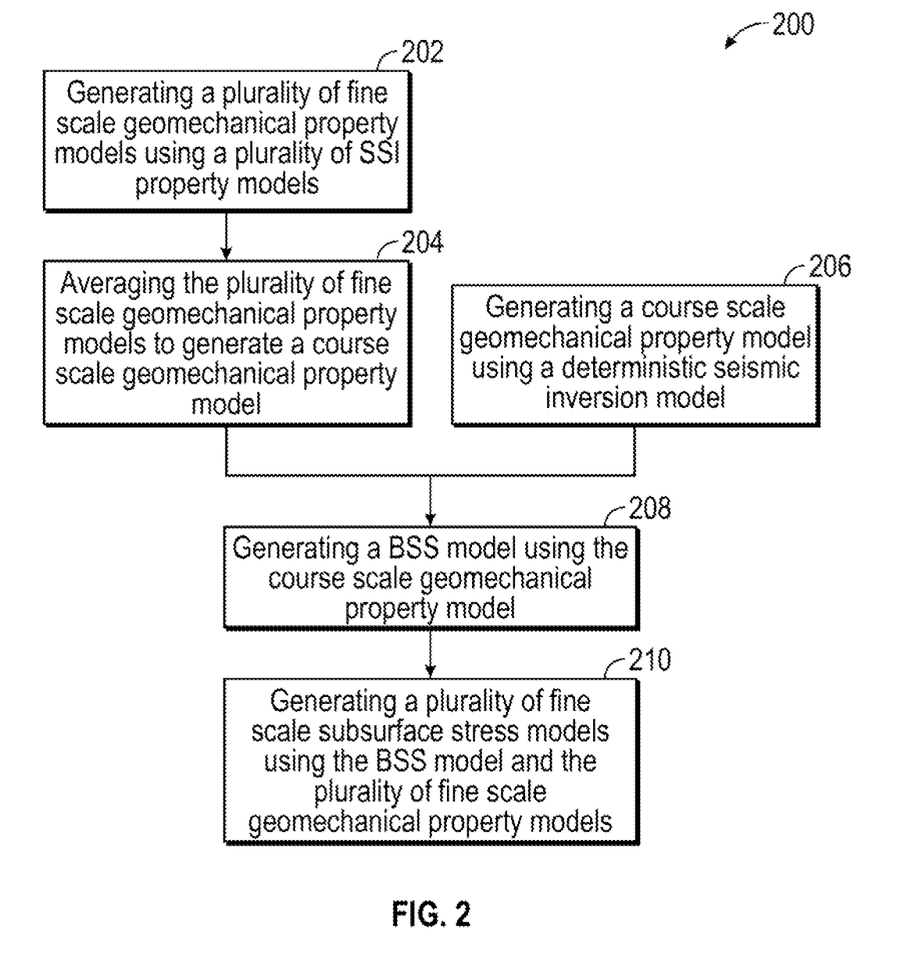
FIG. 2 illustrates a flowchart of a method for generating the subsurface stress models, according to an embodiment.

FIG. 2 illustrates a flowchart of a method 200 for generating subsurface stress models 112, according to an embodiment. Referring to FIGS. 1 and 2, the method 200 may include two examples of approaches for creating the BSS model 110. The approaches relate to the way that the coarse scale geomechanical property model 108 is created. The first approach may include generating a plurality of fine scale geomechanical property models 106 using a plurality of SSI property models 102, as at 202 in FIG. 2. More particularly, one or more fine realizations of inversion attributes (e.g., acoustic impedance, $V_p/V_s$, and/or density) from the SSI property models 102 may be used to generate the fine scale geomechanical property models 106. In at least one embodiment, each of the fine scale geomechanical property models 106 may be equally probable.

The stochastic seismic inversion may invert for acoustic impedance, $V_p/V_s$-ratio, and/or density. The inputs to the stochastic seismic inversion may be seismic angle stacks, well logs (e.g., acoustic impedance, $V_p/V_s$-ratio, and/or density) in the time domain, a 3D geological grid (where the resolution may be decided), and/or variogram models. The 3D geological grid may be constructed so that the vertical variations in the well logs are captured. In the stochastic inversion kernel, the seismic may be inverted for acoustic impedance, $V_p/V_s$-ratio, and/or density. The high-resolution, multi-part of the seismic inversion properties may be generated from introducing well logs in the inversion process. The results may include multiple, high-resolution (e.g., the same resolution as the 3D geological grid) models of acoustic impedance, $V_p/V_s$ and/or density, each of which may fit the seismic equally well. This is because the seismic may be band-limited (e.g., low resolution). Therefore, by introducing high-resolution well logs in the inversion process, there may be multiple models that "match" the seismic. The outputs from the stochastic inversion may include multiple, high-resolution models of acoustic impedance, $V_p/V_s$-ratio, and/or density which have a direct relationship with the dynamic mechanical properties Young's modulus and Poisson's ratio. For example, $$E_{dyn} = \rho V_{s2}(3V_{p2}/V_{s2}-4)/(V_{p2}/V_{s2}-1) \text{ and } \nu_{dyn}=0.5$$
$$(V_{p2}/V_{s2}-2)/(V_{p2}/V_{s2}-1).$$

where $E_{dyn}$ and $\nu_{dyn}$ are the dynamic Young's modulus and Poisson's ratio, respectively. The shear wave velocity $V_s$ may be computed as $V_s = AI/(\rho V_r)$, where AI is the acoustic impedance, $V_r$ is the $V_p/V_s$ ratio, and $\rho$ is the volumetric mass density. Each of these may be derived from the seismic inversion.

For the sake of modeling the reservoir response to quasi-static changes in stresses, deformations, and pressures, the static properties may be estimated. These estimations may not be directly derived from AVO inversion data alone. As such, laboratory tests may be used to derive and apply formation-specific correlations linking the static and dynamic properties. A pragmatic approach in the absence of laboratory data would be using available correlations for the specific lithology in question.

The fine scale geomechanical property models 106 may then be averaged to upscale the fine scale geomechanical property models 106 into the coarse scale geomechanical property model 108, as at 204 in FIG. 2. The coarse scale geomechanical property model 108 may contain a property distribution that represents an equivalent geomechanical medium of the fine scale details.

The second approach for creating the BSS model 110 may include generating the coarse scale geomechanical property model 108 using a deterministic seismic inversion model, as at 206 in FIG. 1. The deterministic seismic inversion may invert for acoustic impedance, $V_p/V_s$-ratio, and/or density. The inputs to the deterministic seismic inversion may be seismic angle stacks and well logs (e.g., acoustic impedance, $V_p/V_s$-ratio, and/or density) in the time domain. The outputs from the deterministic inversion may be acoustic impedance, $V_p/V_s$-ratio, and/or density with the same resolution as the input seismic (e.g., low resolution). This is because high-resolution well logs are not introduced in the inversion process. For example, geostatistics may not be introduced to the inversion; rather, a deterministic approach may be used. Accordingly, the deterministic inversion may be limited by the band-width (e.g., resolution) of the input seismic. In stochastic inversion, multiple, high-resolution models of acoustic impedance, $V_p/V_s$-ratio, and/or density may be created. Averaging one or more of these models from stochastic inversion (e.g., averaging the acoustic impedance models into one acoustic impedance model, averaging the $V_p/V_s$-ratio models into one $V_p/V_s$-ratio model, and averaging the density models into one density model) gives an acoustic impedance model, a $V_p/V_s$-ratio model, and density model that is very similar to a deterministic inversion model. A deterministic inversion is not a prerequisite for a stochastic inversion; however, the stochastic inversion process may be started by running a deterministic inversion. This is why two options for creating the coarse geomechanical model are provided: 1) averaging the fine scale models from a stochastic inversion and/or 2) using the deterministic inversion results. The conversion from the inversion properties acoustic impedance, $V_p/V_s$-ratio, and/or density to the mechanical properties Young's modulus and Poisson's ratio may be the same for both approaches, the difference being that, for the stochastic inversion properties, there may be multiple models of acoustic impedance, $V_p/V_s$-ratio, and/or density to convert, and for the deterministic inversion, there is one output of acoustic impedance, $V_p/V_s$-ratio, and/or density.

At this point, the coarse scale geomechanical property model 108 has been obtained either using the first or second approach. The coarse scale geomechanical property model 108 may then be input into a geomechanical simulator to calculate or generate (e.g., using 3D finite element computations) the BSS model 110, as at 208 in FIG. 2. In at least one embodiment, this may involve assigning stress boundary conditions such that the stress field (in the BSS model 110) predicted from the coarse scale geomechanical property model 108 may be matched with observations that allow an inference of the actual subsurface stress magnitudes and directions. Observations made near the wellbore may help constrain the magnitude of applied stress boundary conditions. With the BSS model 110 obtained, it may be possible to evaluate each of the combinations of mechanical properties that are consistent with the seismic observations generating the BSS model 110.

The BSS model 110 may then be combined with one or more of the fine scale geomechanical property models 106 to generate one or more fine scale subsurface stress models 112, as at 210 in FIG. 1. The BSS model 110 may have a lower resolution than the fine scale geomechanical property models 106. As such, the BSS model 110 may be computed on a coarse equivalent medium of the high/fine scale geomechanical property models 106.

The fine scale subsurface stress models 112 may be generated using one of several approaches. In at least one embodiment, the fine scale subsurface stress models 112 may be generated using constant local strain with a high resolution stiffness matrix and a low resolution strain tensor. In another embodiment, the fine scale subsurface stress models 112 may be generated using weighted constant local strains, and the strains may be modified to minimize the total potential energy. In yet another embodiment, the fine scale subsurface stress models 112 may be generated using a variable strain by making use of shape functions to distribute strains to the fine scale subsurface stress models 112 within the spatial domain of a single coarse model element. The BSS model 110 may be a collection of grid blocks or elements. One element from the BSS model 110 may contain many fine scale elements from the fine scale subsurface stress models 112. The definition of coarse and fine model is based on the size of their elements. The strain from the coarse scale geomechanical property model 108 may be mapped to the fine scale subsurface stress model 112 by identifying the fine scale elements (from the fine model) that exist within a single coarse scale element (e.g., from the coarse geomechanical property model 108 or the BSS model 110). In yet another embodiment, the fine scale subsurface stress models 112 may be generated using equilibrated approaches by solving for equilibrium within the coarse element or its neighborhood.

Figure 3:
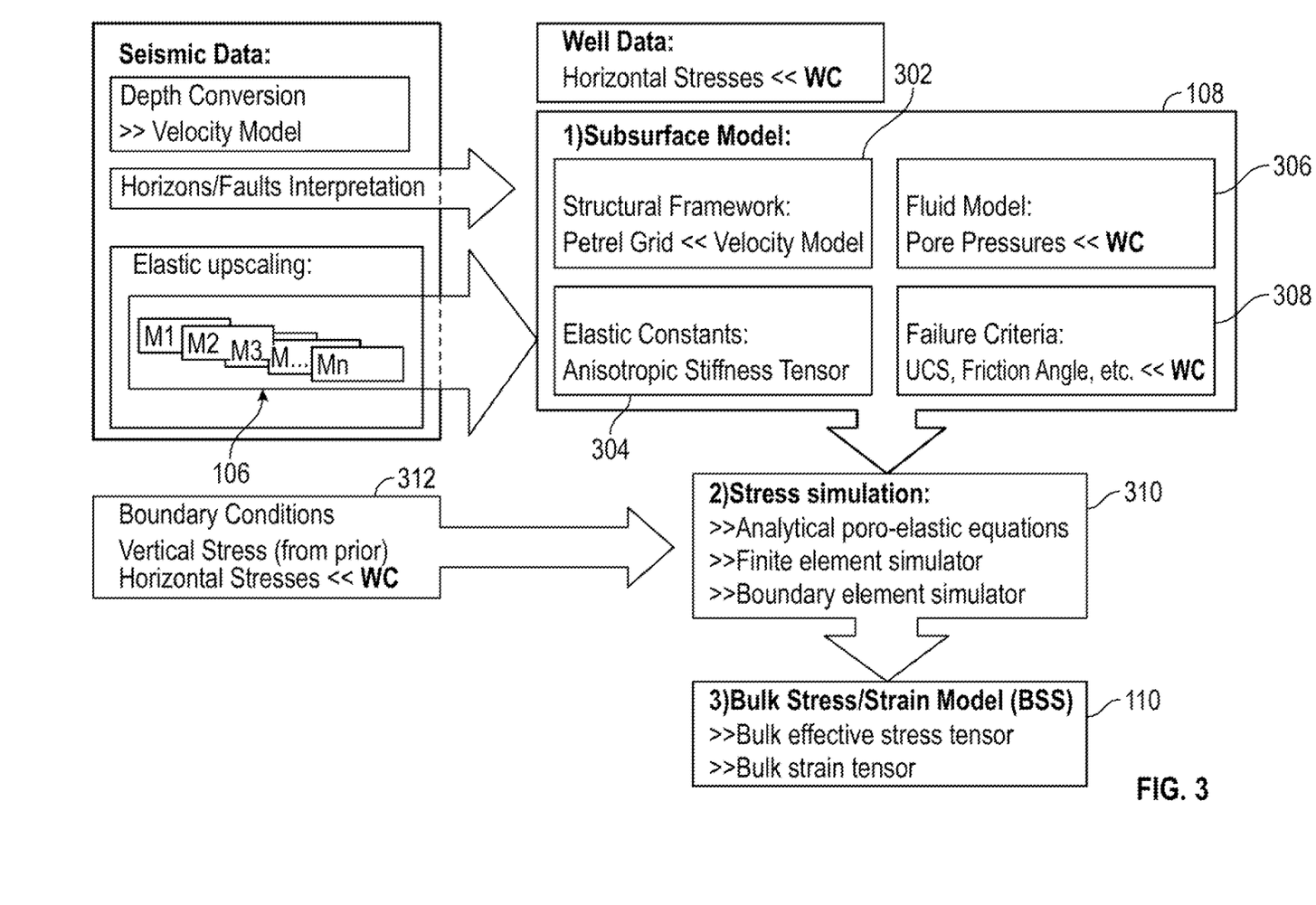
FIG. 3 illustrates a schematic view of a first approach for creating the BSS model, according to an embodiment.

FIG. 3 illustrates a schematic view of the first approach for creating the BSS model 110, according to an embodiment. The fine scale geomechanical property models 106 may be averaged to elastically upscale the fine scale geomechanical property models 106 into the course scale geomechanical property model 108. Additional seismic data may also be used to generate the course scale geomechanical property model 108. For example, depth conversion data (e.g., a velocity model) and/or a horizons/faults interpretation may be used to generate the course scale geomechanical property model 108. The course scale geomechanical property model 108 may be an equivalent mechanical medium (e.g., anisotropic) as the fine scale geomechanical property models 106.

The coarse scale geomechanical property model 108 may include a structural framework 302, elastic constants 304, a fluid model 306, and/or failure criteria 308. The structural framework 302 may include a velocity model that is output from, for example, a PETREL® grid. The elastic constants 304 may include an anisotropic stiffness tensor. The fluid model 306 may include well calibration data that is output from pore pressure data. The failure criteria 308 may include well calibration data that is output from uniaxial compressive strength ("UCS"), friction angles, etc.

The coarse scale geomechanical property model 108 may be input into a geomechanical simulator 310. One or more boundary conditions 312 may also be input into the geomechanical simulator 310. The geomechanical simulator 310 may use analytical poro-elastic equations, a finite element simulator, and/or a boundary element simulator to generate the BSS model 110. The BSS model 110 may include one or more bulk effective stress tensors and one or more bulk strain tensors.

Figure 4:
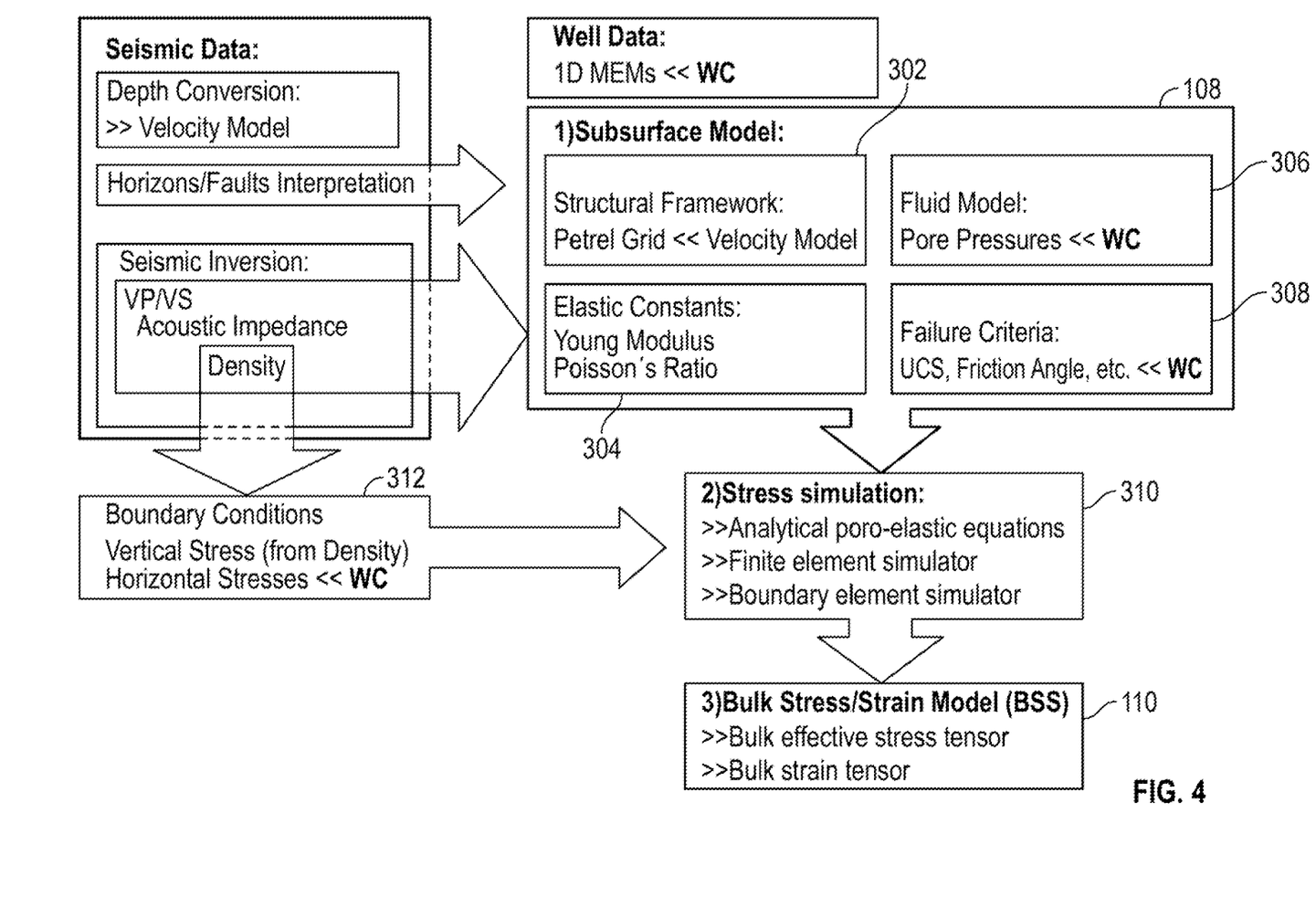
FIG. 4 illustrates a schematic view of the second approach for creating the BSS model, according to an embodiment.

FIG. 4 illustrates a schematic view of the second approach for creating the BSS model 110, according to an embodiment. The second approach is similar to the first approach, except for a few differences, which are described below. Instead of averaging the fine scale geomechanical property models 106 as in FIG. 3, the seismic inversion data from the SSI property models may be used to generate the coarse scale geomechanical property model 108. The seismic inversion data may also be input into the boundary conditions. The seismic inversion data may include acoustic impedance, $V_p/V_s$, and/or density. $V_p$ represents the velocity of the compression waves, and $V_s$ represents the velocity of the shear waves.

The elastic constants in the coarse scale geomechanical property model 108 may also differ in the second approach. For example, the elastic constants may include Young's Modulus and/or Poisson's ratio.

Figure 5:
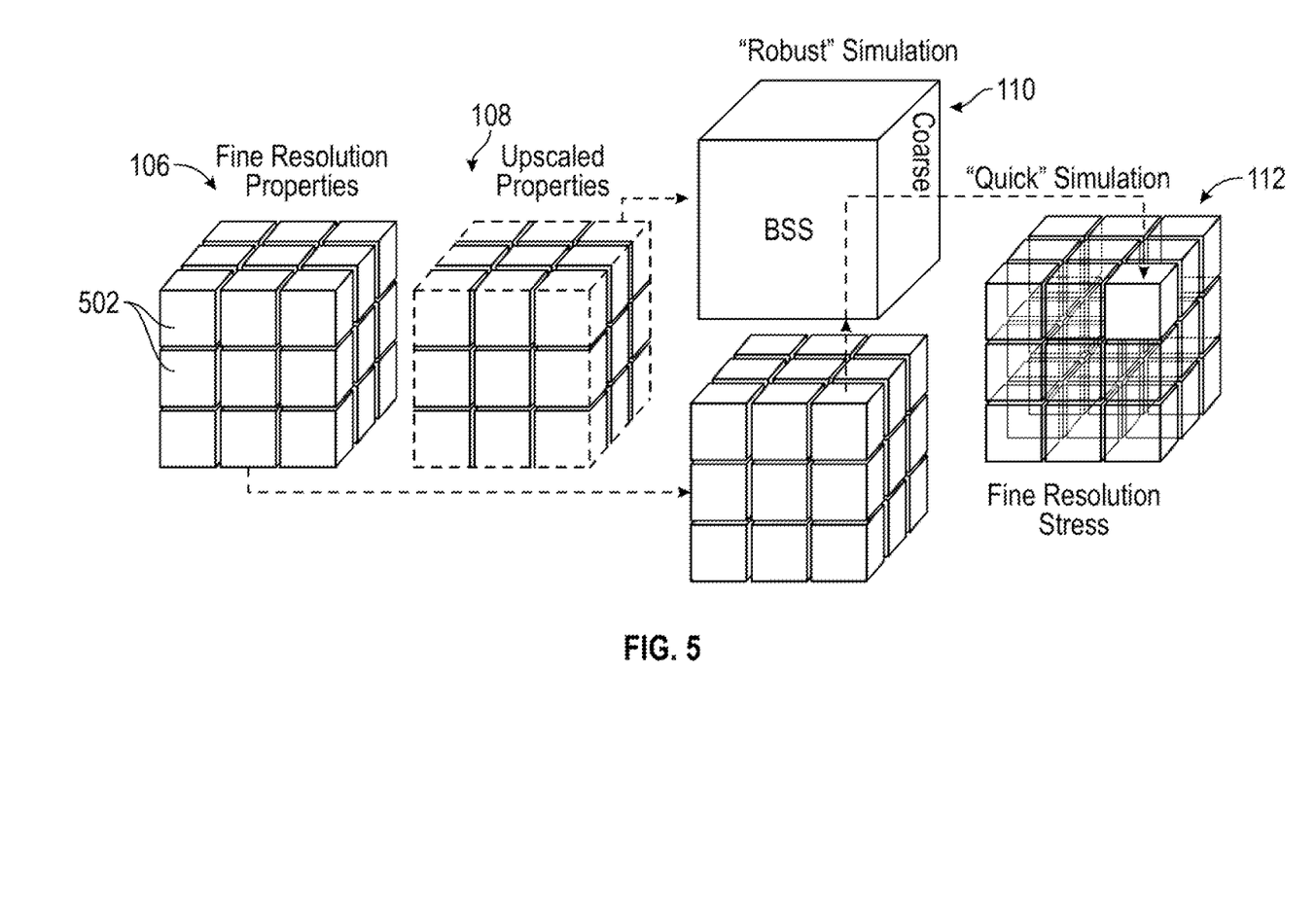
FIG. 5 illustrates a schematic view of the stress downscaling, according to an embodiment.

FIG. 5 illustrates a schematic view of the stress downscaling, according to an embodiment. FIG. 5 shows one of the plurality of fine scale geomechanical property models 106. The fine scale geomechanical property model 106 is shown to include 27 cells 502 (e.g., 3×3×3); however, as will be appreciated, the number of cells 502 is provided for illustrative purposes and may be higher or lower in other embodiments.

The coarse scale geomechanical property model 108 may include fewer cells 502 than the fine scale geomechanical model 106. As shown in FIG. 5, the coarse scale geomechanical property model 108 includes a single cell 502 making the ratio of cells 27:1 between the fine and coarse scale geomechanical property models 106, 108. In other embodiments, this ratio may be higher or lower.

The BSS model 110 may be generated from the coarse scale geomechanical model 108. As such, the BSS model 110 may include fewer cells 502 than the fine scale geomechanical property model 106 (i.e., the BSS model 110 may be coarse). The fine scale geomechanical property model 106 may be combined with the BSS model 110 to generate the fine scale subsurface stress model 102. As seen, the fine scale subsurface stress model 112 may have a higher resolution than the BSS model 110. For example, the fine scale subsurface stress model 112 may have the same resolution as the fine scale geomechanical property model 106 (e.g., 27 cells). By performing "quick" simulations, along with some assumptions regarding the behavior of the strain within a control volume (e.g., the coarse scale geomechanical property model 108), a plurality of stress computations may be generated that approximate the fine scale mechanically-coupled solution with a globally-coupled/locally-decoupled fast solution.

The seismic inversion process may be inherently non-unique, meaning that there may be a plurality (e.g., infinite) number of elastic property models that fit the seismic data. The output of the deterministic inversion may be limited to the input seismic resolution, capturing a bulk elastic response and with the layering details smeared over the seismic wavelength. At such a level of detail, there may be multiple combinations of layers that generate the same seismic response above some threshold misfit.

In another embodiment, the stochastic seismic inversion may generate a suite of realizations that agree with the bulk seismic response and well data and that may account for uncertainties or non-uniqueness associated with the seismic inversion process. The multiple realizations may be ultimately captured in a suite of geomechanical property models fed by the inversion outputs, which in turn may provide a suite of possible responses of the reservoir under prescribed conditions.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 6:
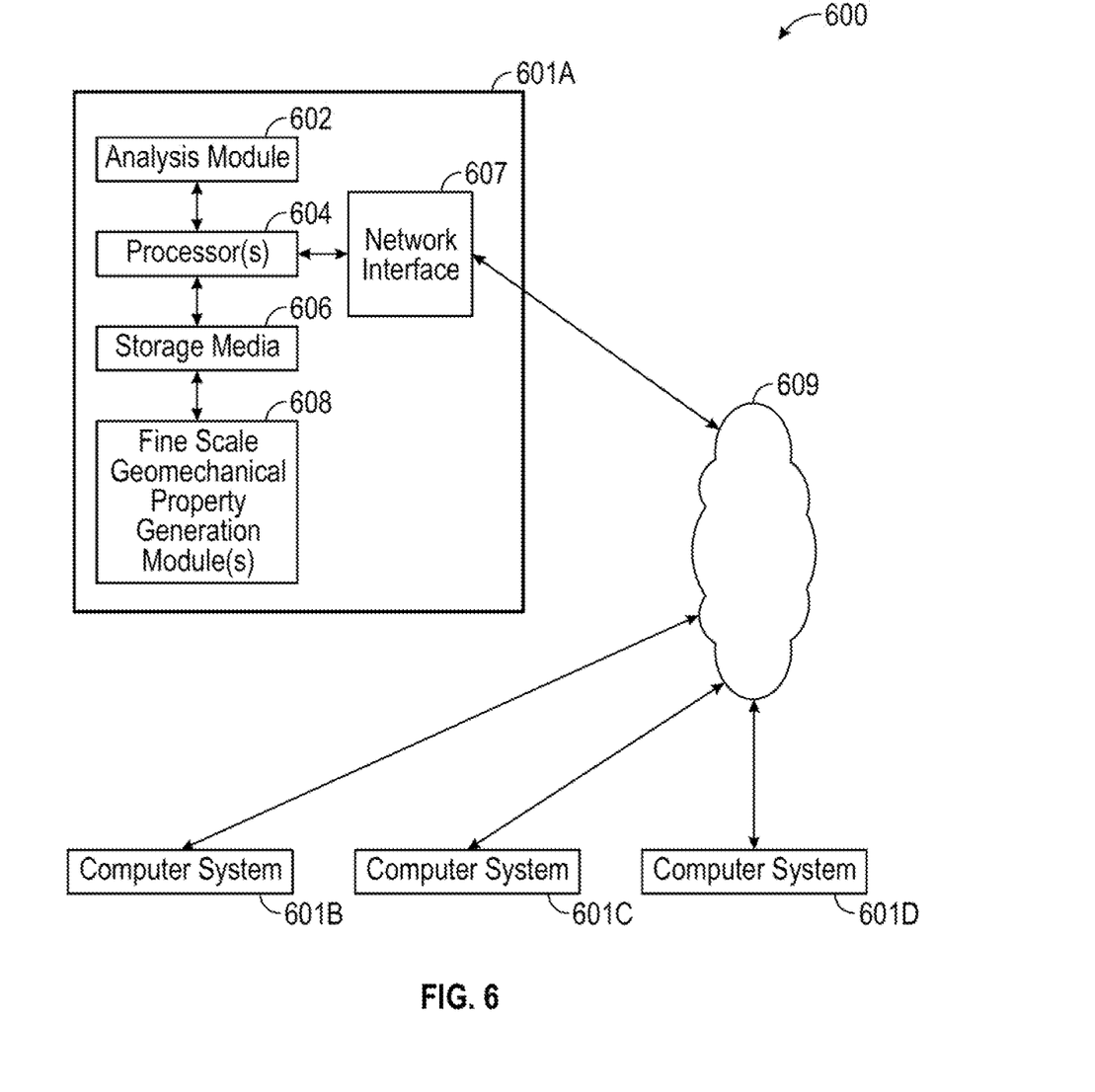
FIG. 6 illustrates a computing system for performing one or more of the methods disclosed herein, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606A. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor can include a microprocessor, microcontroller, processor module or subsystem, programmable integrated circuit, programmable gate array, or another control or computing device.

The storage media 606A can be implemented as one or more computer-readable or machine-readable storage media. Note that while in the example embodiment of FIG. 6 storage media 606A is depicted as within computer system 601A, in some embodiments, storage media 606A may be distributed within and/or across multiple internal and/or external enclosures of computing system 601A and/or additional computing systems. Storage media 606A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 600 contains one or more fine scale geomechanical property generation module(s) 608. In the example of computing system 600, computer system 601A includes the fine scale geomechanical property generation module 608. In some embodiments, a single fine scale geomechanical property generation module may be used to perform some or all aspects of one or more embodiments of the methods disclosed herein. In alternate embodiments, a plurality of fine scale geomechanical property generation modules may be used to perform some or all aspects of methods herein.

It should be appreciated that computing system 600 is only one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

It is important to recognize that geologic interpretations, models and/or other interpretation aids may be refined in an iterative fashion; this concept is applicable to the methods as discussed herein. This can include use of feedback loops executed on an algorithmic basis, such as at a computing device (e.g., computing system 600), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated. Additional information supporting the disclosure is contained in the appendix attached hereto.

What is claimed is:

1. A method for generating one or more subsurface stress models, comprising:
   receiving seismic data of a subterranean formation;
   generating inversion attributes by performing a stochastic seismic inversion on the seismic data, wherein the inversion attributes comprise acoustic impedance, a ratio of a compression wave velocity to a shear wave velocity, and density;
   generating a plurality of first geomechanical property models based at least partially on the inversion attributes, wherein the plurality of first geomechanical property models represent the acoustic impedance, the ratio of the compression wave velocity to the shear wave velocity, and the density, and wherein the first geomechanical property models are substantially equally probable to one another;
   generating a second geomechanical property model based at least partially on the seismic data, wherein the second geomechanical property model has a lower resolution than the first geomechanical property models;
   generating a stress model, a strain model, or a combination thereof based on the second geomechanical property model, wherein the stress model, the strain model, or the combination thereof has a lower resolution than the first geomechanical property models;
   generating a first subsurface stress model based on one of the first geomechanical property models and the stress model, the strain model, or the combination thereof; and
   generating a second subsurface stress model based on another one of the first geomechanical property models and the stress model, the strain model, or the combination thereof, wherein the first and second subsurface stress models have a higher resolution than the stress model, the strain model, or the combination thereof.

2. The method of claim 1, wherein the first geomechanical property models are generated based at least partially on a plurality of stochastic seismic inversion property models, and wherein the stochastic seismic inversion property models are based at least partially on the seismic data.

3. The method of claim 2, further comprising averaging the first geomechanical property models to generate the second geomechanical property model.

4. The method of claim 1, wherein the second geomechanical property model is generated based on a deterministic seismic inversion model, and wherein the deterministic seismic inversion model is based at least partially on the seismic data.

5. The method of claim 1, wherein the one or more subsurface stress models are generated by solving for equilibrium within the stress model, the strain model, or the combination thereof.

6. The method of claim 1, further comprising displaying the one or more subsurface stress models.

7. The method of claim 1, wherein the one or more subsurface stress models are generated using constant local strain with a stiffness matrix and a strain tensor, wherein the stiffness matrix has a higher resolution than the strain tensor.

8. The method of claim 1, wherein the one or more subsurface stress models are generated using weighted constant local strains.

9. The method of claim 8, further comprising reducing a potential energy of the local strains.

10. The method of claim 1, wherein the one or more subsurface stress models are generated using a variable strain by making use of shape functions to distribute strains within the stress model, the strain model, or the combination thereof.

11. The method of claim 1, wherein the seismic data comprises seismic angle stacks, a well log, a 3D geological grid, or a combination thereof captured by a downhole tool.

12. The method of claim 1, wherein generating the stress model, the strain model, or the combination thereof comprises assigning stress boundary conditions such that a stress field in the stress model, the strain model, or the combination thereof is matched with actual field observations that allow an inference of actual field subsurface stress magnitudes and directions.

13. The method of claim 1, wherein generating the plurality of first geomechanical property models based at least partially on the seismic data comprises estimating static properties based at least partially on amplitude-variation-with-offset inversion data and actual tests to derive and apply formation-specific correlations linking the static properties and dynamic properties.

14. The method of claim 1, wherein a single element from the stress model, the strain model, or the combination thereof contains a plurality of elements from the first subsurface stress model.

15. The method of claim 1, wherein a strain from the second geomechanical property model is mapped to the first and second subsurface stress models by identifying fine scale elements from the first geomechanical property models that exist within a single coarse scale element from the second geomechanical property model.

16. The method of claim 1, wherein the first and second subsurface stress models have a same resolution as the first geomechanical property models.

17. The method of claim 1, wherein the second geomechanical property model is generated based at least partially on the seismic data and depth conversion data, and wherein the depth conversion data comprises a velocity model.

18. The method of claim 1, wherein the second geomechanical property model is generated based at least partially on the seismic data and a horizon interpretation.

19. The method of claim 1, wherein the second geomechanical property model comprises:
   a velocity model;
   an anisotropic stiffness tensor;
   a fluid model comprising well calibration data that is output from pore pressure data; and
   well calibration data that is output from uniaxial compressive strength, friction angles, or both.

20. The method of claim 1, wherein the stochastic seismic inversion is performed on an angle stack in the seismic data.

21. The method of claim 1, wherein the acoustic impedance, the ratio of the compression wave velocity to the shear wave velocity, and the density, represented in the plurality of first geomechanical property models individually have a direct relationship with one or more dynamic mechanical properties of Young's modulus of the subterranean formation and one or more dynamic mechanical properties of Poisson's ratio of the subterranean formation.

22. A non-transitory computer-readable medium storing instructions that, when executed by at least one processor of a computing system, cause the computing system to perform operations, the operations comprising:
   generating inversion attributes by performing a stochastic seismic inversion on seismic data of a subterranean formation, wherein the inversion attributes comprise acoustic impedance, a ratio of a compression wave velocity to a shear wave velocity, and density;

generating a plurality of first geomechanical property models based at least partially on the inversion attributes, wherein the plurality of first geomechanical property models individually represent the acoustic impedance, the ratio of the compression wave velocity to the shear wave velocity, and the density, and wherein the first geomechanical property models are substantially equally probable to one another;

generating a second geomechanical property model that has a lower resolution than the first geomechanical property models;

generating a stress model, a strain model, or a combination thereof using the second geomechanical property model, wherein the stress model, the strain model, or the combination thereof has a lower resolution than the first geomechanical property models;

generating a first subsurface stress model based on one of the first geomechanical property models and the stress model, the strain model, or the combination thereof; and generating a second subsurface stress model based on another one of the first geomechanical property models and the stress model, the strain model, or the combination thereof and first geomechanical property models, wherein the first and second subsurface stress models have a higher resolution than the stress model, the strain model, or the combination thereof.

23. The computer-readable medium of claim 22, wherein the first geomechanical property models are generated using a plurality of stochastic seismic inversion property models.

24. The computer-readable medium of claim 23, further comprising averaging the first geomechanical property models to generate the second geomechanical property model.

25. A computing system comprising:
one or more processors; and
a memory system comprising one or more non-transitory computer-readable media storing instructions that, when executed by at least one of the one or more processors, cause the computing system to perform operations, the operations comprising:
generating inversion attributes by performing a stochastic seismic inversion on seismic data of a subterranean formation, wherein the inversion attributes comprise acoustic impedance, a ratio of a compression wave velocity to a shear wave velocity, and density;

generating a plurality of first geomechanical property models based at least partially on the inversion attributes, wherein the plurality of first geomechanical property models represent the acoustic impedance, the ratio of the compression wave velocity to the shear wave velocity, and the density, and wherein the first geomechanical property models are substantially equally probable to one another;

generating a second geomechanical property model that has a lower resolution than the first geomechanical property models;

generating a stress model, a strain model, or a combination thereof using the second geomechanical property model, wherein the stress model, the strain model, or the combination thereof has a lower resolution than the first geomechanical property models;

generating a first subsurface stress model based on one of the first geomechanical property models and the stress model, the strain model, or the combination thereof; and generating a second subsurface stress model based on another one of the first geomechanical property models and the stress model, the strain model, or the combination thereof and first geomechanical property models, wherein the first and second subsurface stress models have a higher resolution than the stress model, the strain model, or the combination thereof.

* * * * *